US011595429B2

(12) United States Patent
Drummond et al.

(10) Patent No.: US 11,595,429 B2
(45) Date of Patent: *Feb. 28, 2023

(54) SYSTEMS AND METHODS FOR DISTRIBUTED P25 LMR RADIO VULNERABILITY MANAGEMENT AND REAL-TIME INTERFERENCE MONITORING

(71) Applicant: 802 Secure, Inc., Pleasanton, CA (US)

(72) Inventors: Garry Drummond, Pleasanton, CA (US); Konrad Grutzmacher, Berkeley, CA (US); Clifford Fernandez, Pleasanton, CA (US); Michael Raggo, Auburn, GA (US)

(73) Assignee: 802 Secure, Inc., Pleasanton, CA (US)

( * ) Notice: Subject to any disclaimer, the term of this patent is extended or adjusted under 35 U.S.C. 154(b) by 177 days.

This patent is subject to a terminal disclaimer.

(21) Appl. No.: 17/189,743

(22) Filed: Mar. 2, 2021

(65) Prior Publication Data

US 2021/0185079 A1    Jun. 17, 2021

Related U.S. Application Data

(63) Continuation of application No. 15/972,521, filed on May 7, 2018, now Pat. No. 10,999,309.

(Continued)

(51) Int. Cl.
*H04L 9/40*      (2022.01)
*H04L 43/16*     (2022.01)
(Continued)

(52) U.S. Cl.
CPC ....... *H04L 63/1433* (2013.01); *H04B 17/318* (2015.01); *H04L 41/22* (2013.01);
(Continued)

(58) Field of Classification Search
CPC ........ H04B 17/20; H04B 17/23; H04B 17/27; H04B 17/309; H04B 17/318;
(Continued)

(56) References Cited

U.S. PATENT DOCUMENTS 10,169,119 B1 *   1/2019  Snyder .................. G06F 11/004
2003/0228857 A1 * 12/2003 Maeki ................... H04B 7/0695
                                                       455/278.1

(Continued)

OTHER PUBLICATIONS

Federal Partnership for Interoperable Communications (FPIC) Security Working Group et al., "Best Practices for Encryption in P25 Public Safety Land Mobile Radio Systems", Sep. 2016, pp. 1-20.

(Continued)

*Primary Examiner* — Olugbenga O Idowu
(74) *Attorney, Agent, or Firm* — Womble Bond Dickinson (US) LLP

(57) ABSTRACT

A threat monitoring and vulnerability management system is disclosed. The system includes one or more sensors configured to scan a frequency spectrum of a project 25 (P25) network and to collect data on the P25 network. The system further includes a server coupled to the sensors and configured to receive the collected data from the plurality of sensors, compare the collected data with previously stored historical data to determine whether an anomaly exists within data patterns of the collected data, responsive to determining that the anomaly exists, determine at least one of: whether use of a cloned radio that mimics an authorized connection occurs, whether jamming of a radio frequency (RF) communication occurs, or whether jamming of a voice communication occurs within the P25 network by comparing the collected data with preset thresholds, and send a real-time alert to a dispatch and control console unit coupled to the server and the P25 network in response to determining that some of the collected data exceeds at least one of the (Continued)

preset thresholds, such that the dispatch and control console unit provides one or more corrective actions to the P25 network.

20 Claims, 5 Drawing Sheets

Related U.S. Application Data

(60) Provisional application No. 62/599,538, filed on Dec. 15, 2017.

(51) Int. Cl.
    *H04B 17/318* (2015.01)
    *H04L 41/22* (2022.01)
    *H04L 43/0823* (2022.01)
    *H04W 12/63* (2021.01)

(52) U.S. Cl.
    CPC .......... *H04L 43/0847* (2013.01); *H04L 43/16* (2013.01); *H04L 63/1425* (2013.01); *H04W 12/63* (2021.01)

(58) Field of Classification Search
    CPC .. H04B 17/3911; H04W 16/14; H04W 24/08; H04W 24/10; H04W 4/029; H04W 64/006; G01S 5/0263
    See application file for complete search history.

(56) References Cited

U.S. PATENT DOCUMENTS

2017/0374573 A1* 12/2017 Kleinbeck .............. H04B 17/27
2018/0211179 A1* 7/2018 Dzierwa .............. H04B 17/391

OTHER PUBLICATIONS

Public Safety Wireless Network (PSWN), "Digital Land Mobile Radio (DLMR) System Security Guidelines Recommendations", Oct. 1998, 33 pp. total.
Yeh, Hen-Geul et al., "Survey of Port Communication Equipment for Safety, Security, and Interoperability", https://www.researchgate.net/publication/238094538, Oct. 29, 2014, pp. 1 23.

* cited by examiner

SYSTEMS AND METHODS FOR DISTRIBUTED P25 LMR RADIO VULNERABILITY MANAGEMENT AND REAL-TIME INTERFERENCE MONITORING

CROSS REFERENCE TO RELATED APPLICATIONS

This application is a continuation of U.S. patent application Ser. No. 15/972,521 filed on May 7, 2018, which claims the benefit of U.S. Provisional Application No. 62/599,538 filed on Dec. 15, 2017, the disclosures of which are incorporated herein by reference.

FIELD OF THE INVENTION

Embodiments of the present disclosure relate generally to secure connection in a digital land mobile radio (LMR) emergency communication system. More particularly, embodiments of the disclosure relate to providing timely alerts to the operators of wireless network performance failures and security breaches within a wireless network.

BACKGROUND

LMR systems have been in use for communication by emergency, public safety, law enforcement and intelligence service providers. These systems provide the capability for critical inter-communication to the first responders engaged in time and mission and performance critical activities during emergency situations. Legacy LMR systems generally use analog narrowband frequency modulation (FM) transmission for point to point communication. In this instance, users carry transceivers that receive transmission from other users over the same broadcast frequency channel. That is, all the radios in the group monitor and share the same channel frequency. In order to improve the capabilities of the person-to-person and person-to-group communication capabilities using the advances of the digital radios, the Association of Public-Safety Communications Officials (APCO) initiated Project 25 (also referred to as P25 or APCO-25), and as such, P25 communication system was produced.

P25 is a suite of digital protocols and standards designed for use in narrowband short-range very high frequency (VHF) and ultra-high frequency (UHF) land-mobile wireless two-way communications systems or digital LMR. P25 is intended as an evolutionary digital communication replacement of the analog two way radios of the legacy LMR. The P25 is meant to be deployed to replace the legacy LMR systems without any major disruption or change in the user experience, network topology, bandwidth requirement, etc. The P25 system was additionally designed to operate as the legacy system using the push-to-talk button. To conform with the legacy systems, and conform to the spectrum standards, the P25 systems use discrete narrowband radio channels and not the spread spectrum techniques normally associated with digital wireless communication. The P25 systems work as half-duplex with only one user transmitting over a given channel at a time. These radios have the capability to constantly receive transmissions over a single channel or scan multiple pre-assigned channels. The radios are able to distinguish received traffic and ignore traffic not intended for them, either by muting the signal or dropping signal which are encrypted using keys not available with them. Current P25 systems use continuous four level modulation (C4FM) within frequency division multiple access (FDMA) modulation scheme over a 12.5 kHz channel with 12.5 kHz spacing to transmit a four-level signal that sends 2 bits with each symbol transmitted to achieve a rate of 4800 symbols/second (sec), which is a bit rate of 9600 bits/sec. The P25 specification also in next phase cover use of a quadrature phase shift keying and time division multiple access (TDMA) and FMDA schemes that uses only 6.25 kHz of spectrum. P25 also enables low bandwidth data traffic independent of the voice, piggy backed over the voice communications.

The P25 system can work in three configurations. They are:

(a) simplex configuration where all members of the group receive and broadcast over the same frequency. This is a direct transmit/receive configuration and has limitations of coverage due to terrain, allowed power, interference from other users, etc.

(b) repeater configuration where the transmitted information is sent to an appropriate repeater location over one frequency, which is then retransmitted at a different frequency by a repeater at another frequency. By optimally choosing the repeater location, wider area coverage can be achieved.

(c) the currently preferred trunk configuration where a central controller allocates frequencies for transmission and reception between any two transceivers dynamically. The available bandwidth can be effectively utilized by time and frequency division multiplexing in this configuration.

The Association of Public-Safety Communications Officials International, Inc. (APCO International) is a group of long-standing partnerships between the public safety communications community, standard development organizations and industry manufacturers. The group's end goal is to satisfy the complex and evolving mission critical communication needs of users for interoperable LMR equipment and systems. To this end the APCO International has put together the P25 that standardizes the operation of the digital LMR and provides for backward compatibility with the prior analog LMR installations.

The P25 process itself focuses on the practical realization of the significant benefits of digital radio communications technologies and promotes the competitive offering of compliant P25 equipment and systems for effective use by a highly diverse user community on a worldwide basis. P25 is an open, user driven standardization process, with technical and operational requirements established through the participation of its stakeholders, including public safety practitioners from different countries representing different levels of government. The standards published by the Telecommunications Industry Association (TIA), for example, establish the basis upon which:

manufacturers across the industry can develop, implement, and competitively offer P25 equipment and systems, accredited laboratories that conduct P25 compliance testing, and specifies, procures, and operates (by users) P25 radios and communications infrastructure.

With all stakeholders working together within P25, public safety organizations and agencies can realize the opportunity to advance technology along a common path that benefits the greatest number of users. P25 defines system interfaces that are utilized to build P25 communications networks. The standards documents define messages and procedures required for P25 features to operate across P25 system interfaces, but do not define equipment.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
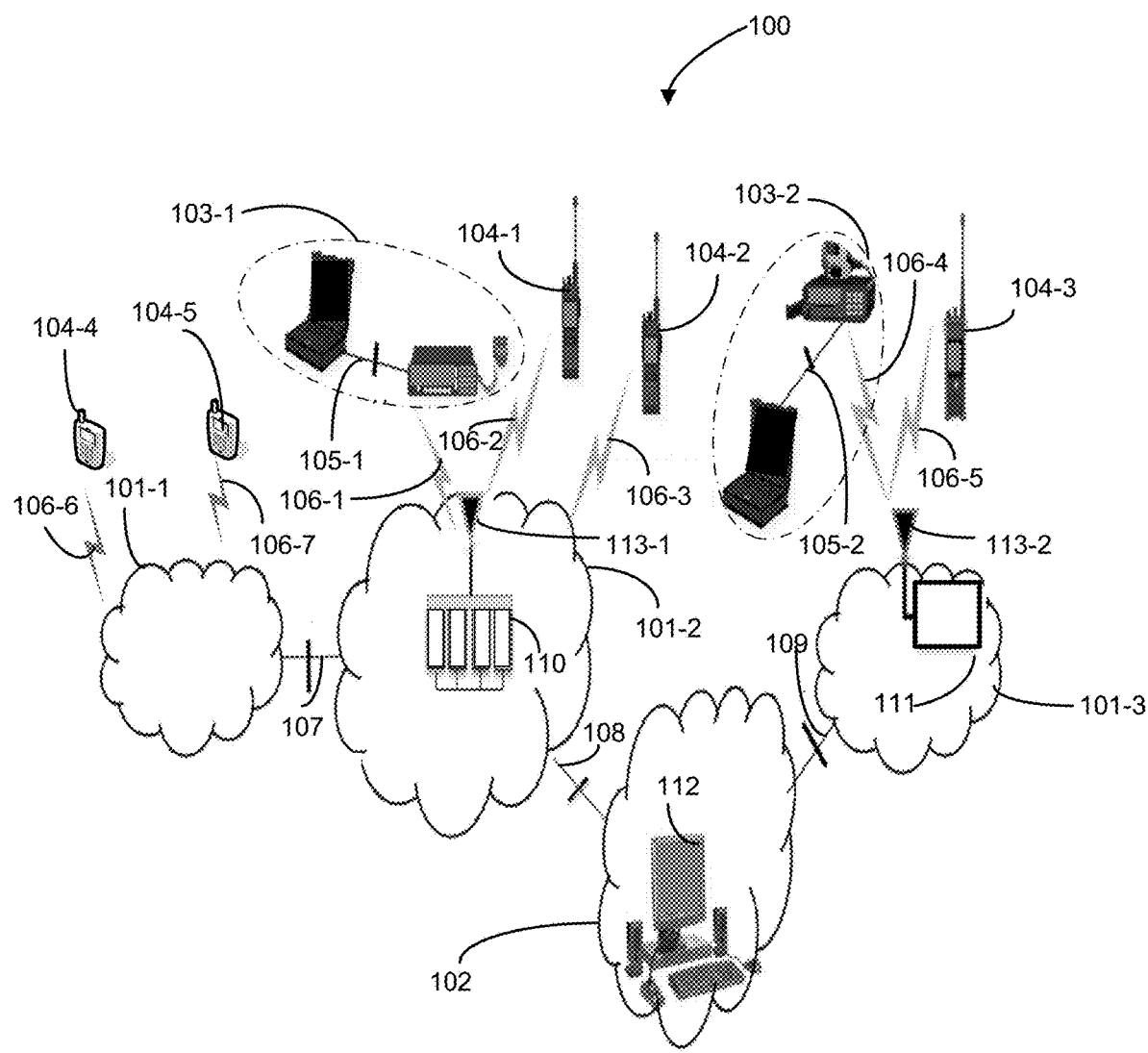
FIG. 1 is a diagram illustrating an example of a conventional implementation of a P25 system.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment", "an embodiment", or "some embodiments" means that a particular feature, structure, or characteristic described in conjunction with the embodiment can be included in at least one embodiment of the disclosure. The appearances of the phrase "in one embodiment" in various places in the specification do not necessarily all refer to the same embodiment.

With the adoption and use of an open communication protocol such as P25 especially within a mission critical role, the risks and threats associated with this technology for exploitation is therefore increasing. For example, hackers or intruders are able to clone first responder's radio devices, jam radio signals and interrupt the mission critical communications in the moments that matter most (i.e., an emergency situation). Also, a problem of the P25 system with compatibility with legacy LMR systems is that the system has a number of vulnerabilities related to security. Hence, there is a need today to have a system and method that can monitor the distributed P25 LMR radio system for vulnerability management and ensuring real-time correction of time sensitive interference and threat issues to network operation to alleviate impact on time critical missions.

According to some embodiments, a monitoring and vulnerability management system and method for identifying and alerting system control of real-time threats and system operational problems of the new digital LMR systems using P25 digital radio network specifications that include standards and protocols used for critical missions by first responders are provided. As previously discussed, with the adoption and use of open communication standards and protocols such as P25 within mission critical roles, the risks and threats associated with this technology for exploitation is increasing. Problems of the P25 system with implementing compatibility with legacy LMR systems have created a number of vulnerabilities related to security within the P25 system implementation. For example, as also previously discussed, hackers are able to clone first responder's radio devices, jam radio signals and interrupt the mission critical communications in the moments that matter most with no capability for the first responders to understand that such problems exist. A monitoring, analyzing, alerting and remedial action enabling system capable of passively monitoring security conditions, radio frequency (RF) performance coverage analytics with real-time forensics of mobile radio or standalone radio communications is implemented with the analytical and computational and alerting capability established in the cloud. Using software-defined radios (SDRs), for example, the initiating devices that establish radio sessions with the centralized dispatch control can be monitored.

In some embodiments, received signals, peak packet counts, message authentication are monitored, and additional data collection to monitor performance, such as bit-error-rate performance, and real-time analysis using the security monitoring platform for all connected P25 radio devices are allowed. In one embodiment, replay protection of security controls and RF coverage scenarios of authenticated devices to identify security threats, such as radio jamming, cloned and/or unauthorized P25 devices are provided. In one embodiment, security monitoring and performance analytics for validating connected P25 devices that are using dynamically assigned IP address are also provided. In one embodiment, real-time analysis of collected data to identify threats and system degradation with capability to identify and assess threat and degradation instances, location and coverage of such instances, and to provide real-time and timely alerts to the system control enabling the system controller to take timely corrective action is further provided. Such alerts and intimations are essential to provide corrective action by the associated system controller of the mission critical LMR P25 network operation. For example, when jammers are detected over a used frequency band, the corrective actions may include intimating and causing automatic change over from the used frequency band to an alternate communication frequency band to provide continued communication capability to the users. As another example, when network characteristics degrade, the corrective actions may include providing for recovery by moving the communication channel to a more optimum alternate channel. Also, in the case where unauthorized devices are identified within the network, intimation is sent to the network controller which is constructed to initiate action to eliminate or block such intruders from accessing the network and tracking or disrupting the communications among users.

In one embodiment, the system includes one or more sensors configured to scan a frequency spectrum of a project 25 (P25) network and to collect data on the P25 network. The system further includes a server coupled to the sensors and configured to receive the collected data from the plurality of sensors, compare the collected data with previously stored historical data to determine whether an anomaly exists within data patterns of the collected data, responsive to determining that the anomaly exists, determine at least one of: whether use of a cloned radio that mimics an authorized connection occurs, whether jamming of a radio frequency (RF) communication occurs, or whether jamming of a voice communication occurs within the P25 network by comparing the collected data with preset thresholds, and send a real-time alert to a dispatch and control console unit coupled to the server and the P25 network in response to determining that some of the collected data exceeds at least one of the preset thresholds, such that the dispatch and control console unit provides one or more corrective actions to the P25 network.

In one embodiment, to determine whether use of the cloned radio occurs, the server is further configured to receive a P25 message from the collected data, to extract a source subscriber unit identifier (SU ID) and signal strength information from the P25 message, to determine whether the SU ID is valid, and to determine whether the signal strength information exceeds a signal strength threshold included in the preset thresholds. In one embodiment, to determine whether jamming of the RF communication occurs, the server is further configured to compare signal interference information from the collected data with a signal interference threshold included in the preset thresholds, and to determine whether there is increased interference based on the comparison. In one embodiment, to determine whether jamming of the voice communication occurs, the server is further configured to compare noise information from the collected data with a noise threshold included in the preset thresholds, and to determine whether the noise information exceeds the noise threshold, thereby reducing a signal to noise ratio (SNR), based on the comparison.

FIG. 1 is a diagram illustrating an example of a conventional implementation of a P25 system. As shown, implementation of a P25 system 100 (e.g., within a city or enterprise environment) includes a P25 network. P25 system 100 shows a variety of interfaces, equipment, and connectivity that are used herein to explain the monitoring and threat recognition capability of the present disclosure. In FIG. 1, system 100 includes a number of radio-frequency sub-system (RFSS) networks 101-1 to 101-3 (which may be part of the P25 network). In one embodiment, RFSS network 101-1 may be location coverage such as a building or an enterprise. RFSS networks 101-1 and 101-2 may be trunked RFSSs that are connected through an inter-subsystem interface (ISSI) 107. RFSS network 101-3 may include a fixed station 111. As further shown, RFSS network 101-2 may include an antenna 113-1 that forms a connection for common air interface (CAI), which may be of the type P25 FDMA CAI, and a repeater station 110. A dispatch and control console sub-system (CSS) network 102 provides main dispatch and control console unit 112, which is the controlling entity for the P25 system covering the city or enterprise environment. The RFSS network 101-2 is connected or coupled to the dispatch and control CSS network 102 via a trunked console subsystem interface (CSSI) 108. Similarly, the RFSS 101-3 network is connected to the CSS network 102 via a conventional digital fixed station interface (DFSI) 109.

Still referring to FIG. 1, LMR units 103-1 and 103-2 have data connections to a transmitter in addition to voice and these are connected or coupled via data links 105-1 and 105-2 respectively. LMR units 103-1 and 103-2 communicate with repeater station 110 via P25 frequency division multi-access modulated common air interfaces (FDMA CAIS) 106-1 and 106-4 respectively. In one embodiment, FDMA CAI 106-1 may be FDMA trunk CAI. In one embodiment, FDMA CAI 106-4 may be FDMA conventional CAI. In some embodiments, FDMA CAI 106-1 and FDMA CAI 106-4 may operate using trunked or common mode using time division multiplexed CAI based on the frequency spectrum and interface allocated to them by the dispatch and control console unit 112. The repeater station 110 and the fixed station 111 may include powerful transceivers and antenna systems (e.g., antennas 113-1 and 113-2 respectively), which may be established on appropriate high ground, and may not be limited in power availability. Such transceivers and antenna systems may be used to extend the range of the transmission to cover larger distances, for example covering all the networks within the whole city. CSS network 102 also uses CSSI 108 to send and receive messages, commands and information to repeater station 110. P25 hand held transceivers 104-1 to 104-5 use the frequency spectrum and modulation allocated to them by dispatch and control console unit 112. In some embodiments, P25 hand held transceivers 104-1 to 104-5 may respectively communicate over communication interfaces 106-2, 106-3, and 106-5 to 106-7, which may be FDMA CAI or TDMA CAI, with each of the communication interfaces 106-2, 106-3, and 106-5 to 106-7 being either trunked or common. In one embodiment, P25 hand held transceivers are constructed to receive in the legacy mode and receive and transmit using P25 digital modes. In one embodiment, CSS network 102 may include a single server-based dispatch and control console unit 112 or a network of servers that handles dispatch instructions, command and control functions of the P25 system that includes, for example, P25 hand held transceivers 104-1 to 104-5. Such control functions may include allocation of frequencies and communication interface modes. The control functions may also include allocation of security protocols used by P25 system 100 and monitoring of the system functions to the extent possible.

As previously discussed, a P25 system (e.g., P25 system 100) has a number of vulnerabilities that result in providing the ability for hackers to attack the system. In order to strengthen the use of the system, it is necessary to monitor and detect any problems, and provide information to CSS network 102 for corrective action(s). Embodiments of the present disclosure provide for such monitoring of functionality, threat assessment, and intimation using distributed software based radios that passively monitor the activity of the connecting and connected units of the P25 network.

Figure 2:
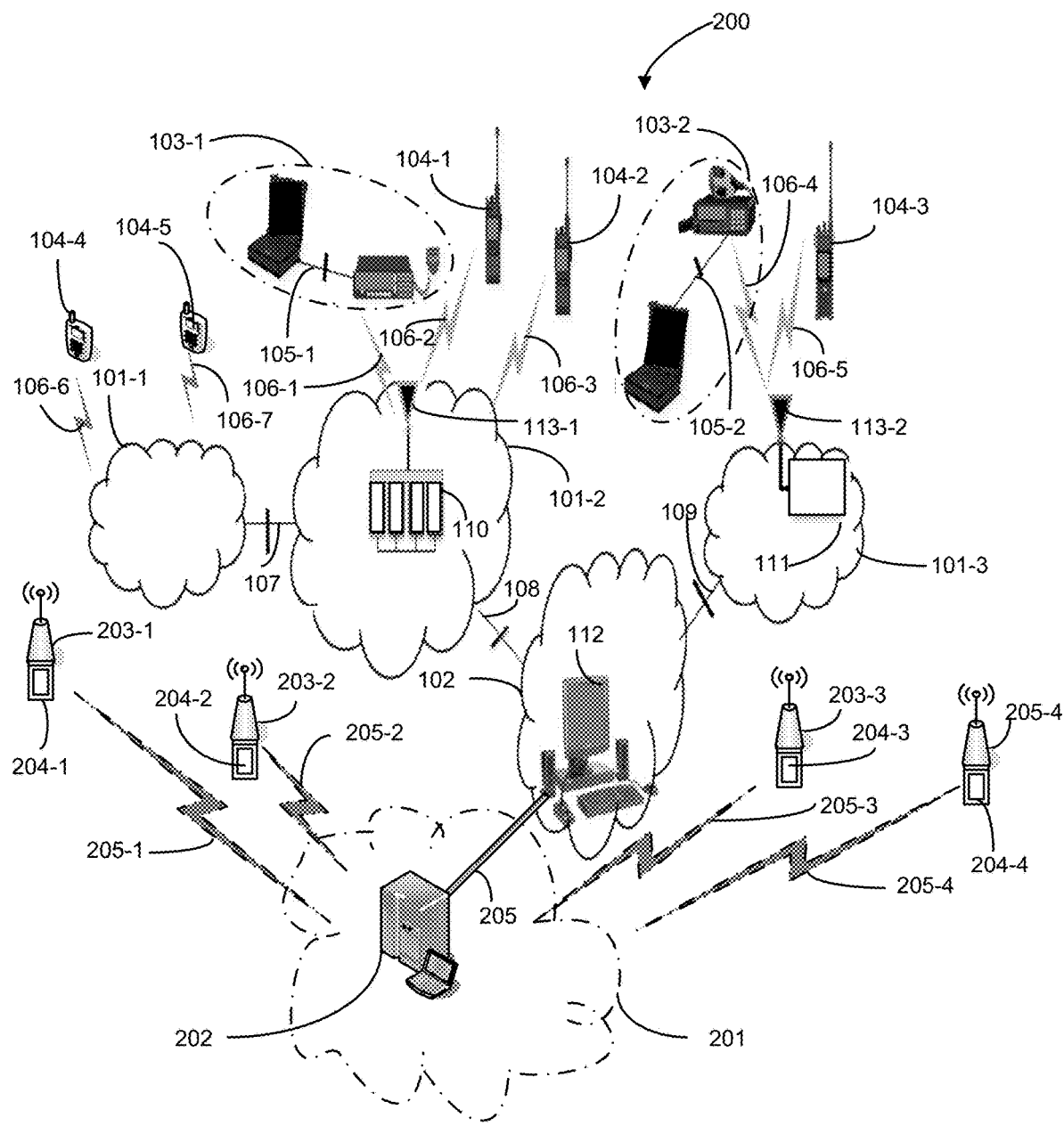
FIG. 2 is a diagram illustrating an example of a threat monitoring and vulnerability management system being implemented over a P25 system according to one embodiment.

FIG. 2 is a diagram illustrating an example of a threat monitoring and vulnerability management system being implemented over a P25 system according to one embodiment. In some embodiments, threat monitoring and vulnerability management system may be implemented with the P25 system 100 of FIG. 1, which is collectively illustrated as system 200 in FIG. 2. As shown, threat monitoring and vulnerability management system may include a cloud-based system 201 (also referred to as cloud service or cloud environment) that operates in conjunction with a number of sensors 204-1 to 204-4 (e.g., SDRs) and distributed antenna systems (DASs) 203-1 to 203-4 (e.g., omni-directional DASs). Sensors 204-1 to 204-4 may be constructed to passively scan the frequency spectrum of a P25 LMR network (e.g., RFSS networks 101-1 to 101-3 of FIG. 1) and provide feedback to cloud-based system 201 over wireless communication links 205-1 to 205-4. As further shown in FIG. 2, cloud-based system 201 may include a monitoring and threat assessment system 202 that receives feedback information from sensors 204-1 to 204-4. In some embodiments, cloud-based system 201 may further include one or more processing units (not shown) coupled to sensors 204-1 to 204-4 and/or DASs 203-1 to 203-4 to passively and/or proactively provide real-time monitoring of the P25 security and functional characteristics that affect the operation of the P25 system (e.g., P25 system 100 of FIG. 1). In some embodiments, monitoring and threat assessment system (202) may be implemented within a separate cloud-based system (201), as shown. In another embodiment, monitoring and threat assessment system (202) may be implemented on premise, for example, within CSS network (102) to communicate with dispatch and control console unit (112).

For effective monitoring of the P25 system, sensors 204-1 to 204-4 and DASs 203-1 to 203-4 are distributed in such a way as to provide coverage outdoors, indoors, and for mobile units. The indoor coverage, for example, may include homes, high rise building units, and office buildings within the P25 coverage area. Such distribution, therefore, reduces blind sports in coverage where attackers can access the system unbeknownst to the monitoring and threat assessment system 202.

In some embodiments, characteristics that are monitored (e.g., by monitoring and threat assessment system 202) provide information on degradation of communication characteristics over the monitored areas of the P25 network. This provides information of the extraneous influences that affect communication in different parts of the P25 system. For example, degradation may be due to jamming activity, over use of the P25 frequency spectrum, interference from power equipment usage, damage to repeater equipment or antenna systems covering the region, or any number of other causes that can cause the coverage and communication capability to degrade. This can result in decrease of received signal strength (RSS) at the receivers, thereby causing problems with reception. The degradation can also cause increase in interference and reduced signal to noise ratio (S/N), both of which would result in high error rates and the inability of any of the LMR units 103-1 to 103-2 or transceivers 104-1 to 104-5 to communicate effectively with other units at critical times. The reduced functionality will also impact the ability of the LMR units 103-1 to 103-2 and/or transceivers 104-1 to 104-5 to communicate with CSS network 102 for receiving instructions and intimation of problems.

Monitoring and threat assessment system 202 may analyze data received in real-time and determine the details that include type, location and coverage of the network performance degradation, and communicate a status of the P25 system and performance issues that have been identified and related extracted details to the CSS network 102. This communication may be performed via an alternate communication link 205 (which may operate on a different communication channel than that of the CAI, such as CAIS 106-1 to 106-7) using for example pre-established short message service (SMS), email, and the like that are not affected by the degradation of the communication channels of the P25 system, so that the dispatch and control CSS network 102 is effectively informed of the problem and can initiate timely and expedient corrective action and/or provide alternate solutions to the users to circumvent the problem.

In some embodiments, the sensors 204-1 to 204-4, with the capabilities of the monitoring and threat assessment system 202, are constructed to act as wireless risk audit toolkit (WRAT) devices, such as 802 Secure, Inc.'s P25CleanRF™ device, having multiple distributed custom antennae. Sensors 204-1 to 204-4 may be disposed around P25 network locations, thereby allowing high bandwidth and range coverage for sensing (or detecting) both general purpose and protocol specific transmissions from within and/or around the covered P25 network locations. As previously described, monitored and captured data may be analyzed in real-time to determine the health of the network control of the P25 system. In one embodiment, the collected data and analyzed results may be stored in a storage device, for example as historical data, by monitoring and threat assessment system 202. In some embodiments, the stored information may include:

a) Normal activities that meet expectations of the system when a unit signs onto the system from various locations and networks, b) Received signal strength indicator (RSSI) values of various locations, c) Problems identified and corrected within the P25 system indicating location of a problem with operational details of the problem and a corrective procedure, d) Degradation trend(s) within the P25 system, and e) Operational characteristics of the P25 system over a time period (e.g., days, months, etc.).

In addition to performance related issues of the P25 network, monitoring and threat assessment system 202 may accept the collected data from the sensors 204-1 to 204-4 using, for example, the DASs 203-1 to 203-4 from across the P25 network, and hence, monitor the activities of the units or devices connecting to the P25 network or surrounding the P25 network. The collected data may be compared with the expected and past data patterns (i.e., historical data) to find discrepancies (i.e., anomaly detection). Any unusual or differing patterns may trigger a real-time detailed analysis of the collected data by the monitoring and threat assessment system 202. Such data analysis may determine and identify any unacceptable behavior patterns that indicate threats to the P25 system and any unauthorized access requests that also pose threats to the system based on abnormality criteria. For example, sensors 204-1 to 204-4 may listen on communication channels, for example CAIS 106-1 to 106-7, in the P25 network and collect the data communicated. As sensors 204-1 to 204-4 continue to listen on the communication channels, monitoring and threat assessment system 202 gains an understanding of what is considered "normal" behavior patterns from the collected data from sensors 204-1 to 204-4. That is, monitoring and threat assessment system 202 may determine that data patterns of the collected data are "normal" and store such collected data as baseline data for subsequent comparison against newly collected data.

In some embodiments, the unacceptable behavior patterns may include:

a) Use of cloned radios that mimic authorized connections. For example, cloned radios may be used by cyber attackers to gain access to the system to track activities and engage in malicious collection of information. Such activities may be recognized or detected by monitoring and threat assessment system 202 and intimated to CSS network 102 via alternate communication link 205. For example, as monitoring and threat assessment system 202 collects data from the P25 network, it may receive P25 messages within the data packets. Each P25 message includes a source subscriber unit identifier (SU ID) and signal strength (or signal power level) that monitoring and threat assessment system 202 may extract to determine whether the SU ID is valid and whether the signal strength is sufficient. Accordingly, if the SU ID is invalid or the signal strength is insufficient (e.g., below or above a predetermined signal strength threshold), monitoring and threat assessment system 202 may determine that the communication involves in the use of cloned radios that mimic authorized connections. The activities may be reported to CSS network 102 to allow dispatch and control console unit 112 to automatically change the current frequency channel to another pre-defined channel where the clone is not present and also intimate the authorized users to ignore or block the communication from the identified clones, b) Jamming of the RF communication within the networks of the P25 system. For example, an attacker can initiate an attack on the P25 system by jamming the RF signal in certain locations as a way to disrupt the communication within the P25 system. The monitoring and threat assessment system 202 may recognize the act of jamming the RF, for example, by the increased interference at a location recognized by sensors 204-1 to 204-4. In doing so, monitoring and threat assessment system 202 may compare signal interference information from the collected data to a preset signal interference threshold. In various cases of jamming, the monitoring and threat assessment system 202 may triangulate on sensors 204-1 to 204-4 and/or use analytics in monitoring and threat assessment system 202 to inform CSS network 102 of the location of the jamming signal via the alternate communication link 205. The dispatch and control console unit 112 included in CSS network 102 may then take automatic corrective action by changing the communication frequency band to an alternate predefined communication band so that the users may continue communicating while further action is taken to disable the jammer and take it out of action, and c) Jamming of voice communication. Another way of disrupting the operation of the P25 system, for example, is to generate noise within the transmission bands that reduces S/R (or SNR) of the recovered signal in the receiver, thereby making communications unintelligible. The sensors 204-1 to 204-4 may listen in on the communications within the P25 system and recognize the increased noise spectrum, and provide intimation (e.g., SMS, email, etc.) to the CSS network 102 of the problem so that the dispatch and control console unit 112 may take corrective action. For example, monitoring and threat assessment system 202 may compare noise information from the collected data with a noise threshold. If the noise information exceeds the noise threshold, thereby reducing the SNR, monitoring and threat assessment system 202 may determine that jamming of a voice communication has occurred.

The monitoring and threat assessment system 202 may further identify, from the data collected, the location and coverage range of any system degradation/threat condition. It also looks at the historic data to see any similar instances and what remedial actions have been taken. Monitoring and threat assessment system 202 may display the information on its graphical user interface (GUI), and when any set threshold for system degradation or threat level is crossed, the information is fed back in an expedited and timely fashion to CSS network 102.

Figure 3:
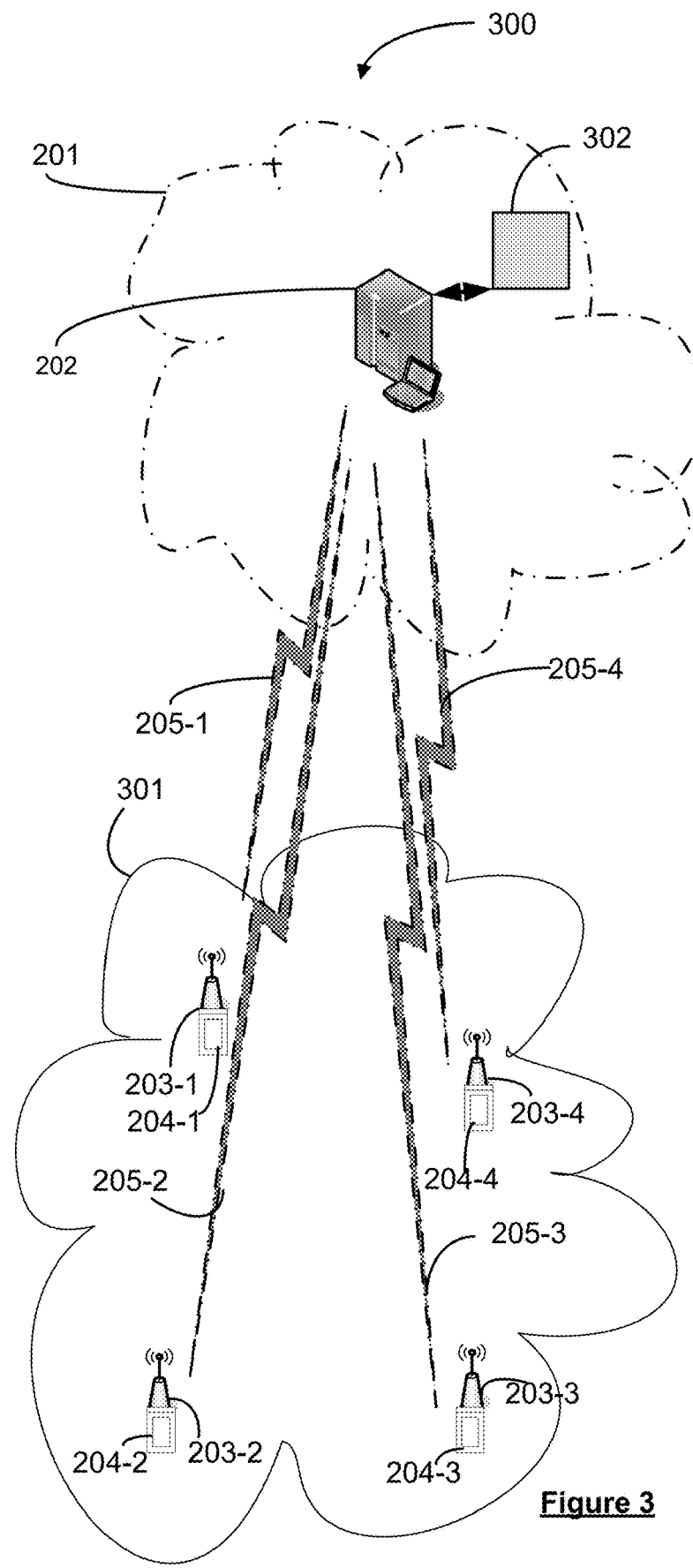
FIG. 3 is a diagram illustrating an example of the threat monitoring and vulnerability management system according to one embodiment.

FIG. 3 is a diagram illustrating an example of the threat monitoring and vulnerability management system according to one embodiment. Referring to FIG. 3, threat monitoring and vulnerability management system 300 includes cloud-based system (or service) 201 and sensors 204-1 to 204-4 respectively coupling or connecting to DASs 203-1 to 203-4. In some embodiments, threat monitoring and vulnerability management system 300 may be a WRAT system from 802 Secure, Inc. The components, other than sensors 204-1 to 204-4 and DASs 203-1 to 203-4, are included in the cloud-based system 201. In one embodiment, sensors 204-1 to 204-4 (and DASs 203-1 to 203-4) are distributed to cover P25 network 301, which may be part of P25 system 100 of FIG. 1 in some embodiments. A brief description of the components and their functions that provide the analysis of collected data to identify and recognize problems is provided herein below.

With continued reference to FIG. 3, cloud-based system 201 may include monitoring and threat assessment system 202. Threat monitoring and vulnerability management system 300 may also include wireless communication links (or interfaces) 205-1 to 205-4 for transferring the collected information from the P25 network space to the monitoring and threat assessment system 202 with the processing capability established in the cloud-based system 201. In one embodiment, cloud-based system 201 may include a historical data store 302 (e.g., a database) that is coupled to the monitoring and threat assessment system 202 to store of the collected and processed information for subsequent comparisons and analysis. In some embodiments, historical data store 302 may be stored on a mass storage implemented using a hard disk drive (HDD) and/or a solid state drive (SSD), or on a persistent storage device of monitoring and threat assessment system 202.

In some embodiments, monitoring and threat assessment system 202 may include any kind of servers or a cluster of servers, such as Web or cloud servers, application servers, backend servers, or a combination thereof. It should be appreciated that while FIG. 3 illustrates four sensors 204-1 to 204-4 and four DASs 203-1 to 203-4, in some embodiments, any number of sensors and DASs may be used within the threat monitoring and vulnerability management system 300.

Figure 4:
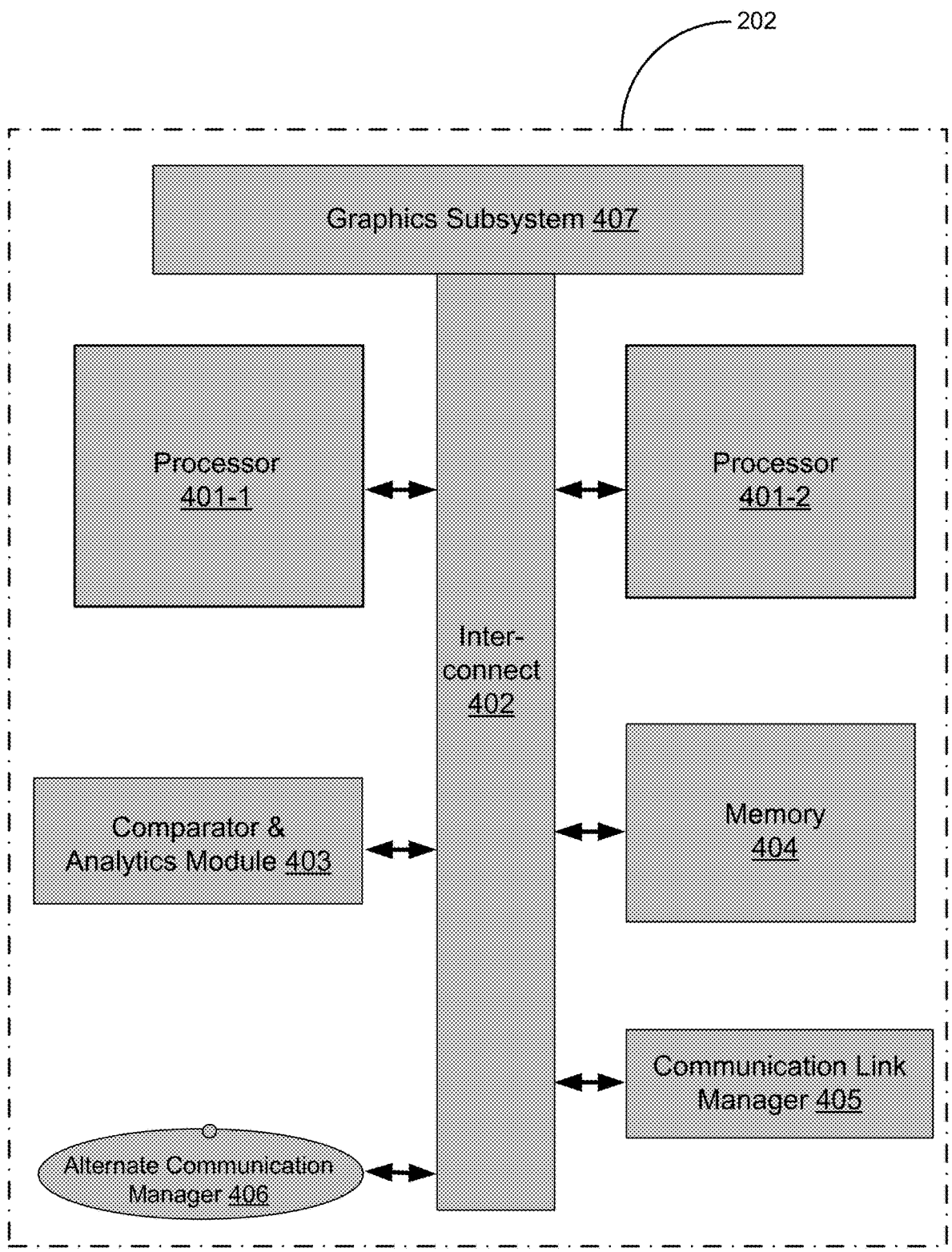
FIG. 4 is a block diagram of a monitoring and threat assessment system according to one embodiment.

FIG. 4 is a block diagram of a monitoring and threat assessment system according to one embodiment. In FIG. 4, monitoring and threat assessment system 202 includes:

a) one or more processors (or processing units/modules) 401-1 and 401-2 which provide the processing power necessary for operations of monitoring and threat assessment system 202, b) a comparator and analytics module (also referred to as block or unit) 403, for example a field-programmable gate array (FPGA), that compares the expected and historic behavior of the connected and connecting communication units (e.g., LMR units 103-1 and 103-2, transceivers 104-1 to 104-5 of FIG. 2) with their current behavior to establish acceptability, and assess and determine a threat condition. In one embodiment, comparator and analytics module 403 may generate feedback notifications (e.g., jamming detection in a particular location or received signal variance on a channel) for the P25 network based on thresholds set by the user, c) a memory 404, which in one embodiment can be implemented via multiple memory devices to provide for a given amount of system memory. Memory 404 may include one or more volatile storage (or memory) devices such as random access memory (RAM), dynamic RAM (DRAM), synchronous DRAM (SDRAM), static RAM (SRAM), or other types of storage devices. Memory 404 may store information including sequences of instructions that are executed by processors 401-1 and/or 401-2, or any other device. For example, executable code and/or data of a variety of operating systems, device drivers, firmware (e.g., input output basic system or BIOS), and/or applications can be loaded in memory 404 and executed by processors 401-1 and/or 401-2. An operating system can be any kind of operating systems, such as, for example, Robot Operating System (ROS), Windows® operating system from Microsoft®, Mac OS/iOS® from Apple, Android® from Google®, LINUX, UNIX, or other real-time or embedded operating systems, d) a communication link manager 405 that establishes and maintains the communication capability of wireless communication links 205-1 to 205-4 with sensors 204-1 to 204-4 and DASs 203-1 to 203-4 in P25 network 301. Communication link manager 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card, e) an alternate communication manager 406 for establishing capability for connecting to the monitoring and threat assessment system 202 to the CSS network 102 that includes the dispatch and control console unit 112. Monitoring and threat assessment system 202, for example, provides feedback to dispatch and control console unit 112 on performance, coverage and threat assessment. As with communication link manager 405, communication manager 406 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card, f) a graphics subsystem 407 that may include a display controller, a graphics processor, and/or a display device. Graphic subsystem 407 may generate a graphical user interface (GUI) that displays information collected from the various locations in a P25 network (e.g., P25 network 301 of FIG. 3). The collected and displayed information may include:

RSSI Mapping,
Bit Error Rate (BER) Mapping,
RF Jamming Detection,
Cloned P25 radios on authorized network,
System Degradation Trends,
P25 Control Channel Validation, and
Real-time, time sensitive feedback provided to dispatch and control console unit 112, which is also part of the threat identification and vulnerability management system, on identified performance degradation/threat that allows dispatch and control console unit 112 to take timely remedial action to ensure continued critical communication capability in the network, such as location and coverage range of the system degradation or threat and previously used remedial steps taken in similar situations if any from historic data.

As further shown in FIG. 4, components 401-1, 401-2, and 403-407 may be connected via a bus or interconnect 402.

In various embodiments, knowing early and in a timely fashion the threats and degradation possibilities of the network, including location and coverage of the problem and the prior remedial steps taken allow the network controller to initiate corrective action to prevent P25 network down times that can impact time and mission critical communication within the network. The corrective action by dispatch and control console unit 112 may involve automatic system generated actions, as well as actions by authorities to correct the problems.

In one embodiment, monitoring and threat assessment system 202, by way of the GUI (as previously described) and communication link manager 405, may remotely configure DASs 203-1 to 203-4 and sensors 204-1 to 204-4. For example, monitoring and threat assessment system 202 may configure or tune DASs 203-1 to 203-4 to increase or decrease their transmission power according to results or feedback information from sensors 204-1 to 204-4.

Figure 5:
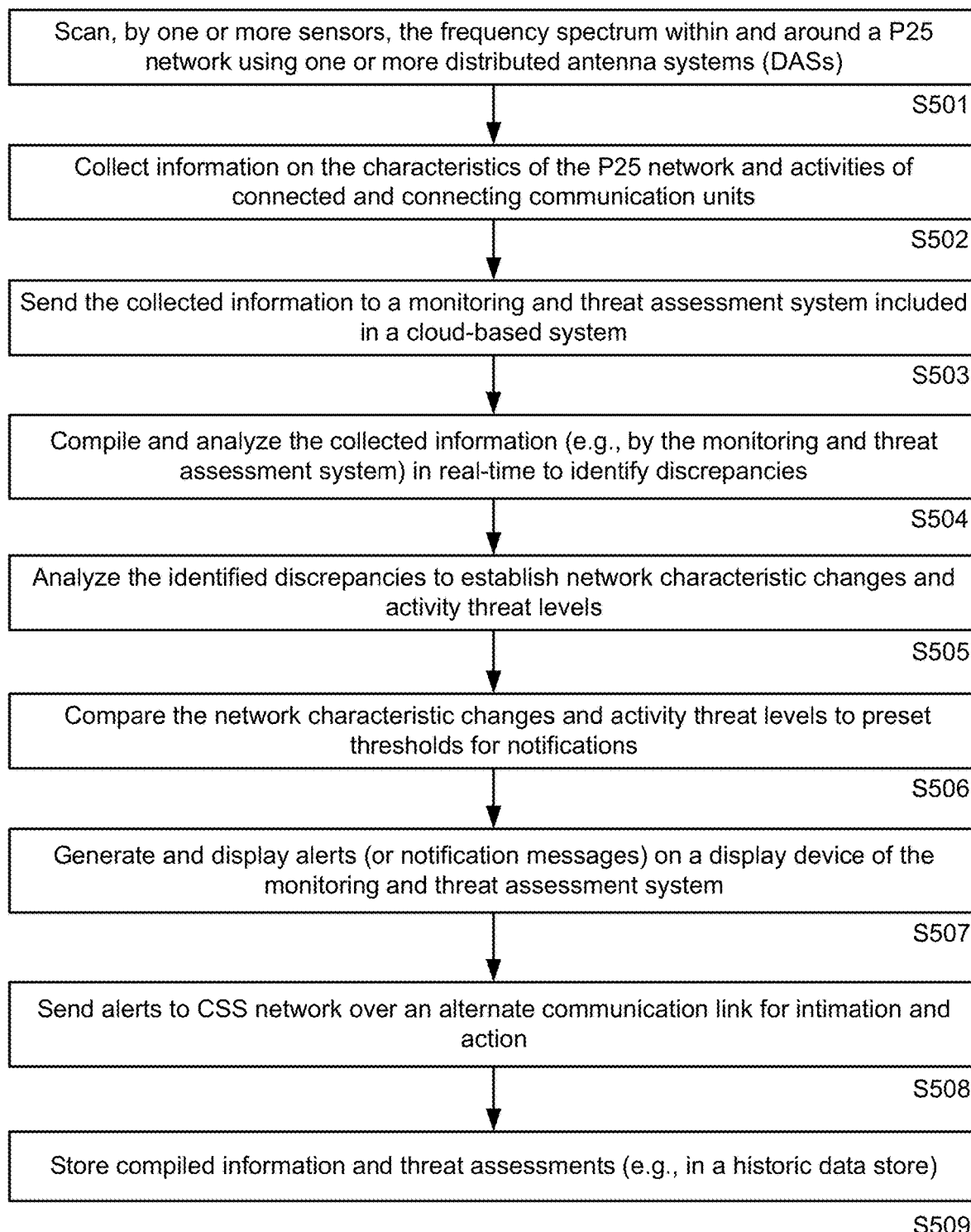
FIG. 5 is a flow diagram of a method for use in a threat monitoring and vulnerability management system according to one embodiment.

FIG. 5 is a flow diagram of a method for use in a threat monitoring and vulnerability management system according to one embodiment. In some embodiments, process 500 may be performed by processing logic which may include software, hardware, or a combination thereof. For example, process 500 may be performed by threat monitoring and vulnerability management system 300 of FIG. 3.

Referring to FIG. 5, at S501, sensors 204-1 to 204-4 scan the frequency spectrum within and around P25 network 301 respectively using DASs 203-1 to 203-4. For example, DASs 203-1 to 203-4 coupled to the distributed sensors 204-1 to 204-4 are strategically placed to provide coverage for P25 network 301 and its surrounding regions by scanning air waves in a continuous, passive mode.

At S502, information on the characteristics of P25 network 301 and activities of connected and connecting communication units are collected. For example, the scan of the frequency spectrum within and around the P25 network 301 allows the sensors 204-1 to 204-4 to collect information on the characteristics of the network functionality at the locations covered. The collected information, for example, may include RSSI, BER, system degradation trends, P25 control channel validation, etc. The scanning of the frequency spectrum also allows the sensors 204-1 to 204-4 to pick up activity information on the communication units or devices (e.g., LMR units 103-1 to 103-2, transceivers 104-1 to 104-5) connected to the P25 network 301 and those attempting to connect. This information is collected for all communication devices at and around the location.

At S503, the sensors 204-1 to 204-4 send the collected information to the monitoring and threat assessment system 202 included in the cloud-based system 201. The collected information, for example, may be sent or transmitted over a different frequency spectrum with appropriate security protections constructed to prevent hacking into the data by unauthorized systems. The monitoring and threat assessment system 202 receives the collected information, compiles and analyzes the information, and displays the system functionality, performance characteristics and analysis done on a display device of monitoring and threat assessment system 202.

At S504, the collected information is compiled and analyzed in real-time. For example, monitoring and threat assessment system 202 may use the compiled information to analyze P25 network 301 in real-time, performance and characteristics by comparing the compiled data with previously stored expected data and historic data, performance and characteristics at a location to identify system performance discrepancies such as low received signal strength, increased bit error rate, RF and voice jammer incidence, and overall system degradation trends within covered locations in the P25 network 301. In addition, the monitoring and threat assessment system 202 may compare the expected and historic activities of connected and connecting communication modules to identify behavioral aberrations of communication units to establish threat propensities. That is, the compiled information regarding network characteristics and activity of communication units received by the monitoring and threat assessment system 202 is compared with a stored expected behavior and normal historic activity to identify discrepancies.

At S505, the identified discrepancies are analyzed to establish network characteristic changes and activity threat levels. In one embodiment, recognized and identified discrepancies and aberrations are sent to an analytic unit (e.g., comparator and analytics unit 403) within monitoring and threat assessment system 202 to determine the reduction in functionality level based on degrading changes in network performance characteristics and increased threat level from connected and connecting communication unit activity.

At S506, the network characteristic changes and activity threat levels are compared to preset thresholds (e.g., user preset thresholds) for notifications. That is, the reduction in functionality and increased threat levels may be compared with preset or predetermined thresholds set by a user (e.g., via the GUI generated by graphics subsystem 407, as previously described) for generation of real-time, time sensitive alerts and notifications to the CSS network 102, and to the dispatch and control console unit 112.

At S507, alerts or notification messages are generated and displayed on a display device of monitoring and threat assessment system 202 when the preset thresholds are crossed or exceeded for either degraded performance of the system or increased threat level, or both.

At S508, notification messages are sent over an alternate communication link to CSS network 102 for intimation and action. For example, the generated notification messages, including the type of degradation or threat identified, the location and range of degradation or threat coverage, and the information extracted from historic data on any corrective actions taken for similar degradation or threat, is transmitted in real-time via an alternate communication link (e.g., communication link 205) that is not impacted by the identified degradation or threat (possibly redundant channels). In some embodiments, the notification may include an SMS, multimedia messaging service (MMS), and/or email to dispatch and control console unit 112 via CSS network 102 for intimation and timely remedial action based on the threat type. Such notification can prevent system down time, which can impact time and mission critical communication within the P25 network.

At S509, compiled information and threat assessments are stored in a historic data store (e.g., historic data store 302). For example, information collected and any response to the information are used by the monitoring and threat assessment unit 202 to update the historic data store for future use to determine normal and abnormal network characteristics and expected and abnormal communication unit activity during analysis and comparison operation on information collected from the P25 network.

While the present disclosure has been described in terms of embodiments, those of ordinary skill in the art will recognize that the disclosure is not limited to the embodiments described, but can be practiced with modification and alteration within the spirit and scope of the appended claims. The description is thus to be regarded as illustrative instead of limiting. There are numerous other variations to different aspects of the embodiments described above, which in the interest of conciseness have not been provided in detail. Accordingly, other embodiments are within the scope of the claims.

In various embodiments, a system and methodology capable of proactively monitoring, using software defined radios and cloud based computer systems, P25 LMR radio networks to provide timely threat alerts to the system control on identified network degradation and threats to the network, and provide an immediate corrective action plan based on prior history such that the network controller (e.g., dispatch and control console unit 112) associated with the system may take corrective action.

In some embodiments, the cloud-based system's processor capability for real-time networks monitoring and analysis for network performance and cyber threat exposure assessment is implemented for generating timely threat alerts and system performance corrections of the LMR P25 communication network typically used by first responders for time and mission critical applications.

In some embodiments, the monitoring system (e.g., monitoring and threat assessment system 202) capable of monitoring vulnerabilities and interferences may monitor real-time signal characteristics, reporting characteristics of the system's radio coverage and signal performance using an SDR and antenna, customized FPGA chipset to detect and interpret P25 radio signals and perform P25 threat assessment at the radio edge, cellular data card back-haul for cloud reporting of performance, coverage and threat assessment, and a central GUI for displaying the data collected from multiple monitoring sensors at multiple locations and to generate real-time alerts based on system degradation and threat details identified as well as provide information, based on historic data, on what remedial actions have been taken for similar instances in the past, based on which the network controller may initiate immediate remedial action.

In some embodiments, the display of monitored and tracked information on a system display may display information such as RSSI mapping, BER mapping, RF jamming detection, cloned P25 radios on an authorized network, system degradation trends such as fragmented frames and dropping of packets, P25 control channel validation such as frequency and protocol health, threat level of any identified cyber security threat instances identified, and location and coverage range of any identified performance degradation.

In some embodiments, a GUI that has the ability to display collected and analyzed information on the health of the P25 network and system.

In some embodiments, a comparison and threat assessment unit constructed to accept the sensor inputs and conduct threat level determination by a unique comparison and threat assessment unit and generate and send real-time and timely threat alerts to the network controller, via SMS, MMS, and email based on thresholds set by the user such that the network controller may take timely response to overcome the threat to the network (i.e. for jamming detected in a location or received signal variance on a particular channel).

In some embodiments, the monitoring remote sensors that can be configured remotely through a cloud interface using the GUI.

In various embodiments, the system capable of identifying and informing the authorities, using real-time alerts, any security breaches from the monitored and tracked information, indicating the threat type, location of threat, regions of the network under threat coverage and based on prior remedial actions taken in similar cases, providing for and initiating real-time remedial action to prevent impact on mission and time critical operations handled by the P25 communication network.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for threat monitoring and vulnerability management on a project 25 (P25) network, the method comprising:

receiving data from a plurality of sensors within the P25 network, the plurality of sensors being distributed to cover the P25 network and to listen in on communications within the P25 network;

analyzing, in real-time, the received data based on historical data patterns associated with the P25 network to determine whether a security threat exists within the P25 network; and in response to determining that the security threat exists, alerting, in real-time, the security threat to a network controller to enable the network controller to take one or more corrective actions in response to the security threat to the P25 network.

2. The method of claim 1, wherein analyzing the received data comprises:

identifying data anomalies in the received data by comparing the received data with the historical data patterns, in response to the identified data anomalies in the received data, comparing the data anomalies with user preset thresholds, and in response to determining that some of the data anomalies exceeds at least one user preset threshold, determining that the security threat exists within the P25 network.

3. The method of claim 2, further comprising: determining whether the security threat is use of a cloned radio that mimics an authorized connection within the P25 network, a jamming of radio frequency (RF) communication within the P25 network, or a jamming of a voice communication within the P25 network.

4. The method of claim 2, wherein the user preset thresholds include a signal strength threshold, a signal interference threshold, and a noise threshold.

5. The method of claim 3, wherein determining whether the security threat is the use of a cloned radio that mimics an authorized connection within the P25 network, the jamming of RF communication within the P25 network, or the jamming of a voice communication within the P25 network comprises:

extracting a source subscriber unit identifier (SU ID) and a signal strength from the received data, determining whether the SU ID is valid, and determining whether the signal strength is below or above a signal strength threshold;

comparing signal interference information from the received data with a signal interference threshold, and determining whether there is increased interference at a location within the P25 network covered by some of the sensors; or comparing noise information from the received data with a noise threshold, and determining whether the noise information exceeds the noise threshold.

6. The method of claim 1, wherein the security threat is alerted to the network controller via a communication link different from the communication links used to receive the data from the plurality of sensors.

7. The method of claim 2, further comprising: displaying information associated with the security threat when some of the received data crosses the at least one user preset threshold.

8. The method of claim 7, wherein the displayed information includes received signal strength indication (RSSI) mapping, bit error rate (BER) mapping, system degradation trends, and P25 control channel validation.

9. The method of claim 1, wherein
the received data comprises network characteristics of the P25 network and activity information of one or more communication devices associated with the P25 network,
the historical data patterns comprise activity information of one or more communication devices that meets expectation of the P25 network when the communication device(s) connect to the P25 network from one or more locations within the P25 network, received signal strength indication (RSSI) values of the one or more locations within the P25 network, problems identified and corrected within the P25 network, locations of the problems, corrective procedures of the problems, and degradation trends within the P25 network.

10. The method of claim 1, further comprising:
obtaining a location within the P25 network where the security threat occurs; and
sending the location to the network controller.

11. A security threat monitoring and vulnerability management system for a project 25 (P25) network, the system comprising:
a processor; and
a memory coupled to the processor to store instructions, which when executed by the processor, cause the processor to perform operations, the operations including:
receiving data using a plurality of sensors within the P25 network, the plurality of sensors being distributed to cover the P25 network and to listen in on communications within the P25 network;
analyzing, in real-time, the received data based on historical data patterns associated with the P25 network to determine whether a security threat exists within the P25 network; and
in response to determining that the security threat exists, alerting, in real-time, the security threat to a network controller to enable the network controller to take one or more corrective actions in response to the determined security threat to the P25 network.

12. The system of claim 11, wherein analyzing the received data comprises:
identifying an anomaly in the received data by comparing the received data with the historical data patterns,
in response to the identified anomaly in the received data, comparing the received data with user preset thresholds, and
in response to determining that some of the received data exceeds at least one user preset threshold, determining that the security threat exists within the P25 network.

13. The system of claim 12, wherein the operations further include: determining whether the security threat is use of a cloned radio that mimics an authorized connection within the P25 network, a jamming of radio frequency (RF) communication within the P25 network, or a jamming of a voice communication within the P25 network.

14. The system of claim 12, wherein the user preset thresholds include a signal strength threshold, a signal interference threshold, and a noise threshold.

15. The system of claim 13, wherein determining whether the security threat is the use of a cloned radio that mimics an authorized connection within the P25 network, the jamming of RF communication within the P25 network, or the jamming of a voice communication within the P25 network comprises:
extracting a source subscriber unit identifier (SU ID) and a signal strength from the received data, determining whether the SU ID is valid, and determining whether the signal strength is below or above a signal strength threshold;
comparing signal interference information from the received data with a signal interference threshold, and determining whether there is increased interference at a location within the P25 network covered by some of the sensors; or
comparing noise information from the received data with a noise threshold, and determining whether the noise information exceeds the noise threshold.

16. The system of claim 11, wherein the security threat is alerted to the network controller via a communication link different than communication links used to receive the data from the plurality of sensors.

17. The system of claim 12, wherein the operations further include: displaying information associated with the security threat when some of the received data crosses the at least one user preset threshold.

18. The system of claim 17, wherein the displayed information includes received signal strength indication (RSSI) mapping, bit error rate (BER) mapping, system degradation trends, and P25 control channel validation.

19. The system of claim 11, wherein
the received data comprises network characteristics of the P25 network and activity information of one or more communication devices associated with the P25 network,
the historical data patterns comprise activity information of one or more communication devices that meets expectation of the P25 network when the communication device(s) connect to the P25 network from one or more locations within the P25 network, received signal strength indication (RSSI) values of the one or more locations within the P25 network, problems identified and corrected within the P25 network, locations of the problems, corrective procedures of the problems, and degradation trends within the P25 network.

20. The system of claim 11, wherein the operations further include:
obtaining a location within the P25 network where the security threat occurs; and
sending the location to the network controller.

* * * * *